United States Patent [19]

Vietor

[11] 4,391,563

[45] Jul. 5, 1983

[54] BUCKET POSITION INDICATOR ASSEMBLY

[75] Inventor: Francis H. Vietor, Terre Haute, Ind.

[73] Assignee: J. I. Case Company, Racine, Wis.

[21] Appl. No.: 297,890

[22] Filed: Aug. 31, 1981

[51] Int. Cl.$^3$ ............................................ B23Q 19/00

[52] U.S. Cl. ............................ 414/698; 37/DIG. 19; 116/230; 116/281; 116/DIG. 7

[58] Field of Search ................. 414/698; 37/DIG. 19; 116/55, 230, 231, 266, 269, 272, 283, DIG. 7, 281, 39; 92/109, 112, 163, 164

[56] References Cited

U.S. PATENT DOCUMENTS

| | | | |
|---|---|---|---|
| 2,808,017 | 10/1957 | Killebrew | 37/117.5 X |
| 3,198,360 | 8/1965 | Strader et al. | 414/698 X |
| 3,251,492 | 5/1966 | Kampert et al. | 414/698 |
| 3,251,493 | 5/1966 | Popelier | 414/698 |
| 3,547,293 | 12/1970 | Borer | 414/698 |
| 3,710,968 | 1/1973 | Clevenger et al. | 414/698 |
| 3,796,335 | 3/1974 | Smith et al. | 414/698 |
| 3,938,549 | 2/1976 | Nunneley | 116/272 X |

*Primary Examiner*—Edgar S. Burr
*Assistant Examiner*—David A. Wiecking
*Attorney, Agent, or Firm*—Cullen, Sloman, Cantor, Grauer, Scott & Rutherford

[57] ABSTRACT

A bucket position indicator assembly for relieving the operator from constantly maintaining visual contact with the bucket and thereby taking his attention away from other operator functions. The bucket position indicator assembly includes a fluid cylinder, a slidable piston actuator, and an indicator panel that is mounted within the operator's compartment. The actuator includes a rod member which is pivotally attached at one end to the bucket movement linkage for reciprocal movement in response to rotational movement by the bucket. The piston end of the actuator is slidably movable within the fluid cylinder in response to the movement of the bucket during its normal duty cycle. A bore through the rod member permits fluid pressure to escape into an annular chamber formed between sealing disks at the piston end of the actuator. A plurality of orifices along the periphery of the fluid cylinder are connected by conduits to corresponding fluid inputs at the indicator panel. The annular fluid chamber formed by the piston end of the actuator becomes aligned with one of the orifices in the fluid cylinder when the bucket is either in a rollout, level, or rollback position. When fluid pressure is applied to any one of the inputs at the indicator panel, a corresponding indicator member appears in a window of the indicator panel so that the operator can determine whether the bucket is level, rolled out, or rolled back.

1 Claim, 2 Drawing Figures

BUCKET POSITION INDICATOR ASSEMBLY

BACKGROUND OF THE INVENTION

This invention relates to an improved indicating assembly for showing the position of a bucket in either a rolled back, level, or rolled out position.

A conventional front end loader includes a bucket that is moved to various standard positions for different phases of its work cycle such as dig, carry and dump. Normally, the bucket is filled at a low forward digging position and then rotated rearwardly to a rolled back or carry position. Later, at the deposit point, the bucket is dumped or rolled out by rotating the bucket forwardly about its pivot axis. Thus, the bucket moves through several positions, including rollback, level, and rollout positions, during its work cycle which requires that the operator have some means for monitoring the position of the bucket in relation to its boom structure.

It is well-known in the prior art to provide loaders with devices for indicating the loader bucket's position in relationship to its boom structure. Such devices relieve the operator of the necessity of constantly maintaining visual contact with the bucket during its work cycle. However, these indicating devices have generally been constructed of mechanical or hydraulic means which are expensive, delicate, and subject to wear and abrasion.

Thus, it is an object of the present invention to provide an improved bucket position indicator assembly that is easy to manufacture and reliable in operation in various environments.

SUMMARY OF THE INVENTION

In accordance with the present invention, the improved bucket position indicator assembly automatically provides the operator with a visual indication that the bucket has moved to one of its various standard positions during its work cycle. This relieves the operator of the necessity of constantly maintaining visual contact with the bucket thereby taking his attention away from other operator functions.

The present invention is disclosed in connection with a front end loader having an elongated body portion with an operator's compartment mounted to the body portion. A pair of lift arms are pivotally connected at one end at a location spaced above the main body and they have downwardly directed end portions adjacent the forward end of the body. The lift arms are adapted to be raised and lowered along opposite sides of the operator's compartment by a pair of fluid rams connected to the lift arms. A material handling device, such as a bucket, is pivoted on the free ends of the downwardly directed end portions of the lift arms and is moved through a hydraulic linkage system for each of the lift arms.

As is conventional, the bucket is moved to various standard positions for different phases of its work cycle such as dig, carry, and dump. Normally, the bucket is filled at a low forward digging position and then rotated rearwardly to a rollback or carry position. At the deposit point, the bucket is then dumped or rolled out by rotating the bucket forwardly about its pivot axis. Thus, the bucket moves through several positions, including rollback, level, and rollout positions, during its work cycle.

According to the invention, the bucket position indicator assembly includes a fluid cylinder, a slidable piston actuator, and an indicator panel which is mounted within the operator's compartment. The fluid cylinder is attached to a lift arm by means of a support member. The actuator includes a piston end that is slidably mounted within the fluid cylinder and a rod member which is pivotally attached to the bucket movement linkage for reciprocal movement in response to movement by the bucket. An interior bore through the rod member permits fluid pressure to escape into an annular chamber that is formed between sealing disks at the piston end of the actuator. Fluid pressure enters the rod bore through a conduit from a source of fluid pressure on the loader.

The fluid cylinder includes a plurality of orifices along its periphery which are connected by conduits to corresponding fluid inputs at the indicator panel. The annular fluid chamber formed by the piston end of the actuator becomes aligned with one of the orifices in the fluid cylinder when the bucket is either in a rollout, level, or rollback position. When fluid pressure is applied to any one of the inputs at the indicator panel, a corresponding flag appears in a window of the indicator panel so that the operator can determine visually whether the bucket is level, rolled out, or rolled back. The indicator flags are slidably movable within the indicator panel in reponse to fluid pressure and only become visible to the operator when fluid pressure enters one of the inputs to the indicator panel. Thus, the operator may readily determine the position of the bucket by the flag which becomes visible at the indicator panel when the bucket is in either its rolled back, level, or rolled out position.

Other advantages and meritorious features of the bucket position indicator assembly of the present invention will be more fully understood from the following description of the invention, the appended claims, and the drawings, a brief description of which follows.

DETAILED DESCRIPTION OF THE INVENTION

Figure 1:
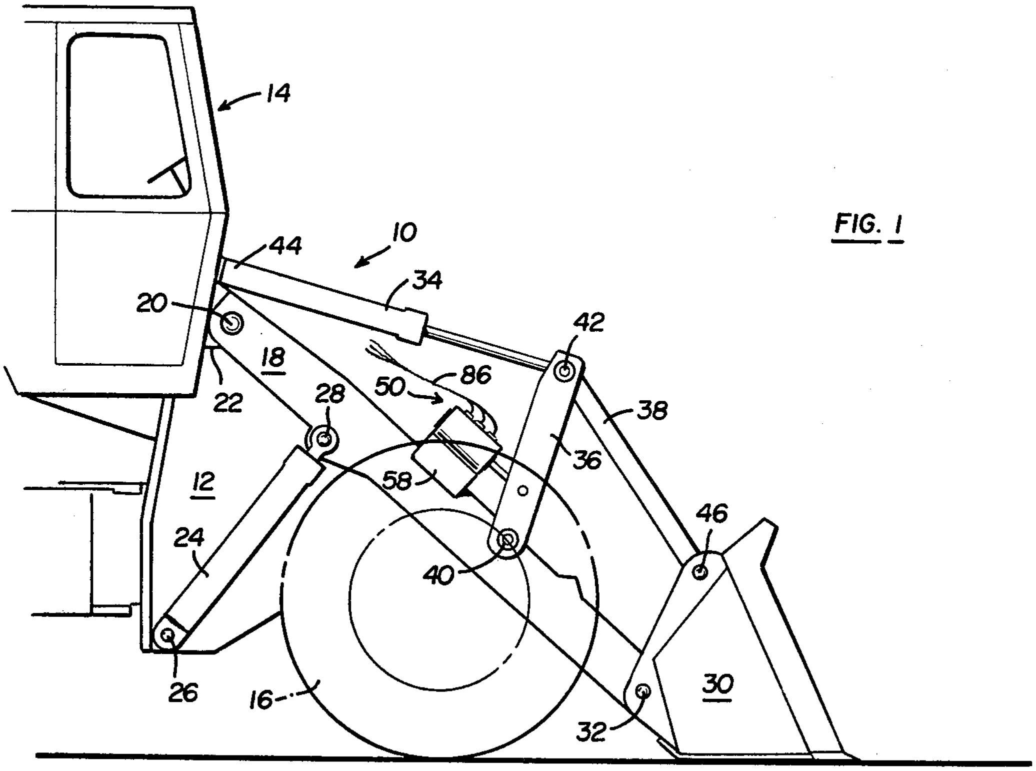
FIG. 1 is a partial side elevational view of a front end loader having the bucket position indicator assembly of the present invention incorporated therein.
Figure 2:
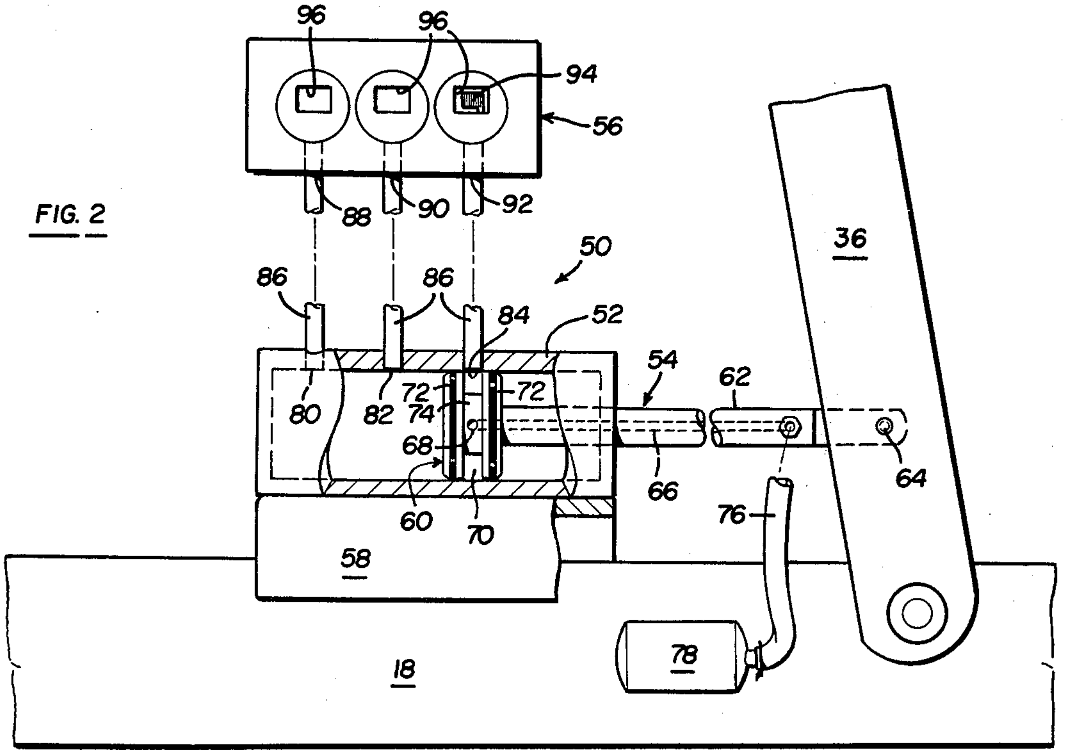
FIG. 2 is an assembly view of the bucket position indicator assembly with portions cut away for easier viewing.

A preferred embodiment of the bucket position indicator assembly for loader buckets made in accordance with the teachings of the present invention is illustrated in FIGS. 1–2.

FIG. 1 of the drawings generally discloses a front end loader 10 consisting of an elongated body 12 having an operator's compartment 14 mounted thereon. The body 12 is supported by ground engaging means consisting of four wheels 16, only one of which is shown in FIG. 1.

Since the remaining elements to be described, with the exception of the bucket position indicator assembly, are duplicated on opposite sides of the main body 12, only one set of elements has been shown with the understanding that the description will likewise refer to an identical set of elements located on the opposite side of the main body.

A pair of lift arms 18 are pivotally connected at one end by pivot pins 20 to support brackets 22 on main body 12. Each lift arm 18 consists of an elongated generally straight main body portion that extends downwardly adjacent the forward end of body 12. The lift arms 18 are adapted to be raised and lowered by fluid rams 24, each including a cylinder pivotally attached to body 12 adjacent its lower end by pin 26 and a piston rod pivotally connected to the underside of lift arm 18 by pin 28. Extension and retraction of fluid rams 24 will move the lift arms 18 between lowered and raised positions.

The downwardly directed ends of lift arms 18 are interconnected by a bucket 30. The bucket 30 is rotated about the pivot points 32 on lift arms 18 through a hydraulic linkage that includes a tilt fluid cylinder 34, a bellcrank 36, and a transmission link 38. Bellcrank 36 is rotatably mounted at one end to lift arm 18 by pin 40 and its opposite end is pivotally connected to both tilt cylinder 34 and link 38 by pin 42. The opposite ends of cylinder 34 and link 38 are pivotally connected to body 12 and bucket 30, respectively, by pins 44 and 46.

As is conventional, the bucket 30 is moved to various standard positions for different phases of its cycle such as dig, carry, and dump. Assuming that the operator has just filled bucket 30 with dirt or the like in the generally level position shown in FIG. 1, subsequent retraction of tilt cylinder 34 will rotate bucket 30 rearwardly to a rollback or carry position. At the deposit point, bucket 30 is dumped or rolled out from the position shown in FIG. 1 by completely extending tilt cylinder 34 thereby rotating bucket 30 forwardly about pivot pins 32. Thus, bucket 30 moves through several positions, including rollback, level, and rollout positions, during its work cycle which requires that the operator have some means for monitoring the position of the bucket in relation to the loader boom.

The bucket position indicator assembly 50 of the present invention relieves the operator of the necessity of constantly maintaining visual contact with bucket 30 thereby taking his attention away from other operator functions. Bucket position indicator assembly 50 includes a fluid cylinder 52, a slidable piston actuator 54, and an indicator panel 56 which is mounted within operator's compartment 14. Fluid cylinder 52 is attached to lift arm 18 by means of a support member 58. Actuator 54 includes a piston end 60 that is slidably mounted within cylinder 52 and a rod member 62 that is pivotally connected to bellcrank 36 by pin 64. Rod member 62 includes an interior bore 66 extending along its longitudinal axis which is open at one end 68 for permitting fluid pressure to escape into the sealed annular chamber 70 that is formed between sealing disks 72 and around reduced diameter connecting portion 74. Fluid pressure enters rod bore 66 through conduit 76 from a conventional source of fluid pressure 78 on loader 10.

Fluid cylinder 52 includes a plurality of orifices 80, 82, and 84 along its periphery which are connected by conduits 86 to corresponding fluid inputs 88, 90, and 92 at the indicator panel 56 within operator's compartment 14. When fluid pressure is applied to any one of the inputs 88, 90 or 92, a corresponding flag or indicator member 94 appears in one of the windows 96 of indicator panel 56. Flags 94 are movable within indicator panel 56 from a non-visible position to a visible position in response to fluid pressure and only become visible to the operator when fluid pressure enters one of the inputs 88, 90 or 92.

FIG. 2 illustrates the position of the piston end 60 when bucket 30 is in its rollout position where tilt cylinder 34 has been extended thereby rotating bucket 30 forwardly about pivot pins 32 for dumping the material from bucket 30. In this position, the sealed annular chamber 70 of piston end 60 is aligned with orifice 84 of fluid cylinder 52. Piston end 60 is slidably movable within cylinder 52 to other positions as bellcrank 36 rotates in response to extension or retraction of tilt cylinder 34. For example, the position of bellcrank 36 in FIG. 2 generally corresponds to a level position for bucket 30 as illustrated in FIG. 1. When bucket 30 is in a level position, piston end 60 is moved so that the annular fluid chamber 70 of piston end 60 becomes aligned with orifice 82 thereby permitting fluid pressure to pass from fluid source 78 through orifice 82 for actuating the flag 94 in the middle window 96 shown in FIG. 2. If tilt cylinder 34 is fully retracted to rotate bucket 30 rearwardly to a rollback or carry position, piston end 60 will be positioned to permit fluid pressure to pass from fluid source 78 through orifice 80 thereby moving a corresponding flag 94 in indicator panel 56 to a visible position. Thus, the operator may readily determine the position of bucket 30 by the indicator member or flag 94 which becomes visible at indicator panel 56 when bucket 30 is in either its rollback, level, or rollout position.

It will be apparent to those skilled in the art that the foregoing disclosure is exemplary in nature rather than limiting, the invention being limited only by the appended claims.

I claim:

1. In a front end loader including an elongated main body having an operator's compartment mounted thereon, a pair of lift arms pivotally connected to said main body and a bucket rotatably mounted between said lift arms, said bucket being rotated by a plural element linkage to various positions during its work cycle including rollback, level, and rollout positions, the improvement comprising:

a bucket position indicator assembly including a fluid cylinder, a slidable actuator, and an indicator panel, said indicator panel being mounted within said operator's compartment, said fluid cylinder being attached to one of said lift arms, said actuator comprising a piston which is slidably mounted within said fluid cylinder and a rod member connected to said piston and also pivotally attached to one of said linkage elements for reciprocal movement in response to rotational movement by said bucket, said piston being slidably movable within said fluid cylinder in response to rotational movement of said bucket during its work cycle, said rod member including an interior bore which is open at one end for permitting fluid pressure to escape into a sealed fluid chamber formed partially by a recess in said piston surrounded by sealing means carried by said piston and partially by said cylinder, and means for constantly communicating fluid pressure to the other end of said interior bore;

said fluid cylinder including a plurality of orifices along its length which are connected by conduits to corresponding fluid inputs at said indicator panel, said sealed fluid chamber becoming aligned with one of said orifices when said bucket is in each of the rollback, level, or rollout positions thereby permitting fluid pressure to be applied to only a corresponding one of said indicator panel inputs, indicator members movably mounted within said indicator panel, said indicator members being movable between non-visible and visible positions, each indicator member being in fluid communication with only one of said inputs to said indicator panel, only one of said indicator members becoming visible to an operator when fluid pressure enters a corresponding indicator panel input thereby indicating to the operator that the bucket is in either its rollback, level, or rollout position.

* * * * *